US007643922B2

(12) United States Patent
Motoyama

(10) Patent No.: US 7,643,922 B2
(45) Date of Patent: Jan. 5, 2010

(54) TURNING BEHAVIOR CONTROL DEVICE FOR VEHICLE

(75) Inventor: Sumio Motoyama, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 553 days.

(21) Appl. No.: 11/255,983

(22) Filed: Oct. 24, 2005

(65) Prior Publication Data

US 2006/0086543 A1    Apr. 27, 2006

(30) Foreign Application Priority Data

Oct. 25, 2004    (JP)    ............... P2004-309074

(51) Int. Cl.
*G06F 17/00* (2006.01)
*B60R 22/00* (2006.01)
(52) U.S. Cl. .................. 701/48; 701/36; 701/41; 701/72; 701/79; 701/69; 701/70; 701/78
(58) Field of Classification Search .......... 701/41, 701/36, 42, 43, 44, 48, 45; 180/6.2, 324, 180/408, 410, 443; 280/5.51, 771, 87.1, 280/773, 775, 777, 88.515–99.515, 734, 280/735, 755, 757; 188/350
See application file for complete search history.

(56) References Cited

U.S. PATENT DOCUMENTS 4,998,593 A    3/1991    Karnopp et al.

5,253,728 A    10/1993   Matsuno et al.
5,408,411 A *  4/1995    Nakamura et al. ............ 701/48
2002/0147532 A1* 10/2002 Inagaki et al. ................. 701/41

FOREIGN PATENT DOCUMENTS

| DE | 103 38 706 A1 | 3/2004 |
| EP | 1 197 410 A2 | 4/2002 |
| EP | 1 396 372 A2 | 3/2004 |
| JP | 9-89076 A | 3/1997 |
| JP | 3183124 B2 | 4/2001 |
| JP | 2003-226255 A | 8/2003 |

* cited by examiner

*Primary Examiner*—Khoi Tran
*Assistant Examiner*—Bhavesh V Amin
(74) *Attorney, Agent, or Firm*—Birch, Stewart, Kolasch & Birch, LLP

(57) ABSTRACT

A turning behavior control device for vehicle has a left and right wheel driving force adjustment mechanism for adjusting a difference in driving force between right and left, a braking force adjustment mechanism for adjusting a difference in braking force between the wheels, an auxiliary steering mechanism for adjusting a steering angle of the wheels, a vehicle velocity sensor, a steering wheel sensor, and a yaw rate sensor for detecting the behavior of a vehicle, and a control unit for controlling the foregoing mechanisms based on the vehicle velocity, the steering angle, and the yaw rate detected by the sensors. The control unit operates the front wheel auxiliary steering mechanism before operating at least one of the left and right wheel driving force adjustment mechanism and the braking force adjustment mechanism.

10 Claims, 4 Drawing Sheets

TURNING BEHAVIOR CONTROL DEVICE FOR VEHICLE

CROSS REFERENCE TO RELATED APPLICATION

This non-provisional application incorporates by reference the subject matter of Application No. 2004-309074 filed in Japan on Oct. 25, 2004, on which a priority claim is based under 35 U.S.C. §119(a).

BACKGROUND OF THE INVENTION

1. Field of the Invention

The present invention relates to a turning behavior control device for vehicle.

2. Description of the Related Art

In general, the vehicle is provided with a left and right wheel driving force adjustment mechanism and a braking force adjustment mechanism to control the behavior of vehicle and stabilize the vehicle while turning. The left and right wheel driving force adjustment mechanism is one that adjusts a difference in driving power between the left and right wheels according to a behavior of the vehicle, and improves the turning performance of the vehicle by controlling the driving force transfer to the left and right wheels while turning. Also, the braking force adjustment mechanism is one that puts a difference in the braking effort between the wheels according to a turning state of the vehicle, to improve stability and turning performance of the vehicle by individually controlling the braking pressure distribution among the wheels while turning.

One example of the conventional turning behavior control device comprises the left and right wheel driving force adjustment mechanism and the braking force adjustment mechanism as mentioned above and controls both the mechanisms according to a yaw rate deviation that is the difference between the target yaw rate calculated based on the vehicle velocity and a steering wheel angle and the actual yaw rate actually occurring in the vehicle. In this example, when the yaw rate deviation is greater than or equal to the first threshold value and less than the second threshold value, the left and right wheel driving force adjustment mechanism is only operated, and when it is greater than or equal to the second threshold value, both the mechanisms are operated.

The conventional turning behavior control device of the vehicle was disclosed in Japanese Patent No. 3183124, for instance.

SUMMARY OF THE INVENTION

However, since the left and right wheel driving force adjustment mechanism and the braking force adjustment mechanism provided for the conventional turning behavior control device of the vehicle were controlled according to the yaw rate deviation, the yaw rate deviation was so minute that the control efficacy was not occasionally exhibited even if the left and right wheel driving force adjustment mechanism and the braking force adjustment mechanism were operated. Thereby, a dead zone (area at or below the first threshold value) that did not operate the left and right wheel driving force adjustment mechanism and the braking force adjustment mechanism was installed in the conventional turning behavior control device.

However, when it is required to control the vehicle behavior in this dead zone, there is a problem that it is difficult to make the minute control under oil pressure due to a power loss caused by clutch wear-out or the clutch operation, when the left and right wheel driving force adjustment mechanism is operated, although the left and right wheel driving force adjustment mechanism and the braking force adjustment mechanism can be operated from a steering area of minute yaw rate deviation by eliminating the dead zone. Also, when the braking force adjustment mechanism is operated, there is a problem that the minute control is more difficult than the left and right wheel driving force adjustment mechanism, due to the brake wear-out or heat generation, and a feeling of deceleration caused by the braking operation.

In addition, there is a problem that the left and right wheel driving force adjustment mechanism and the braking force adjustment mechanism are ineffective during the normal operation (area at or below the first threshold value) where the lateral force compliance of the tire is large, although the left and right wheel driving force adjustment mechanism and the braking force adjustment mechanism are especially effective in a turn limit area (area above the first threshold value) where the lateral force compliance of the tire (grip power) is small or the road surface where the frictional force is low.

Accordingly, this invention has been achieved to solve the above-mentioned problems, and it is an object of the invention to provide a turning behavior control device for vehicle that operates the wheel steering mechanism for controlling the wheel steering angle from a steering area where the yaw rate deviation is minute, wherein the handling and stability of the vehicle is improved by expanding the area where the vehicle behavior control is made.

In order to accomplish the above object, the present invention provides a turning behavior control device for a vehicle comprising, a left and right wheel driving force adjustment unit that adjusts a difference in driving force between left and right wheels for the vehicle, a steering angle adjustment unit that adjusts a steering angle for at least one of the front and rear wheels for the vehicle, a vehicle behavior detection unit that detects the behavior of the vehicle, and a control unit that controls the left and right wheel driving force adjustment unit and the steering angle adjustment unit, based on the vehicle behavior detected by the vehicle behavior detection unit, wherein the control unit operates the steering angle adjustment unit before operating the left and right wheel driving force adjustment unit.

With the turning behavior control device for vehicle according to the invention, the area where the vehicle behavior control is made can be expanded, whereby the handling and stability of the vehicle is improved.

DETAILED DESCRIPTION OF INVENTION

Figure 1:
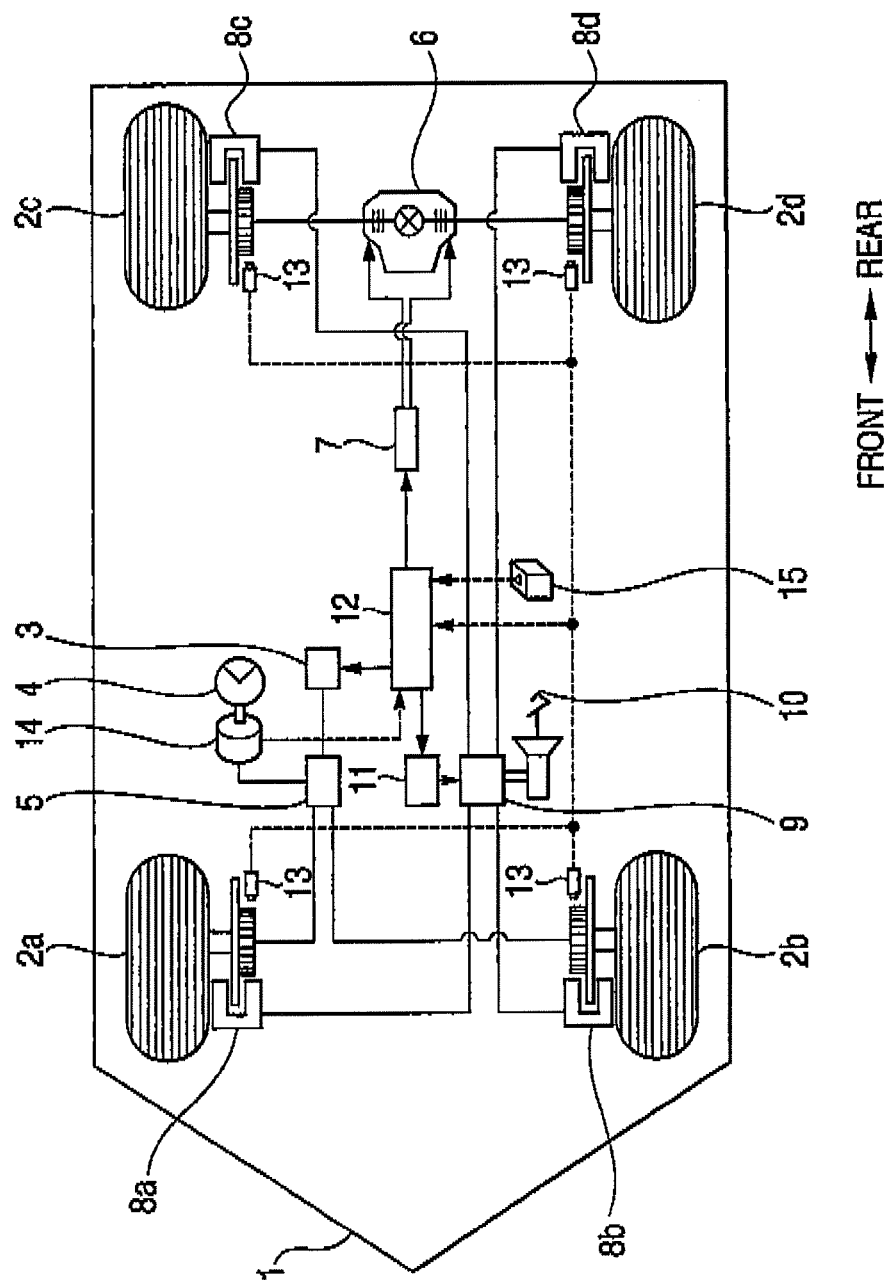
FIG. 1 is a schematic diagram of the vehicle having a turning behavior control device according to one embodiment of the present invention.
Figure 2:
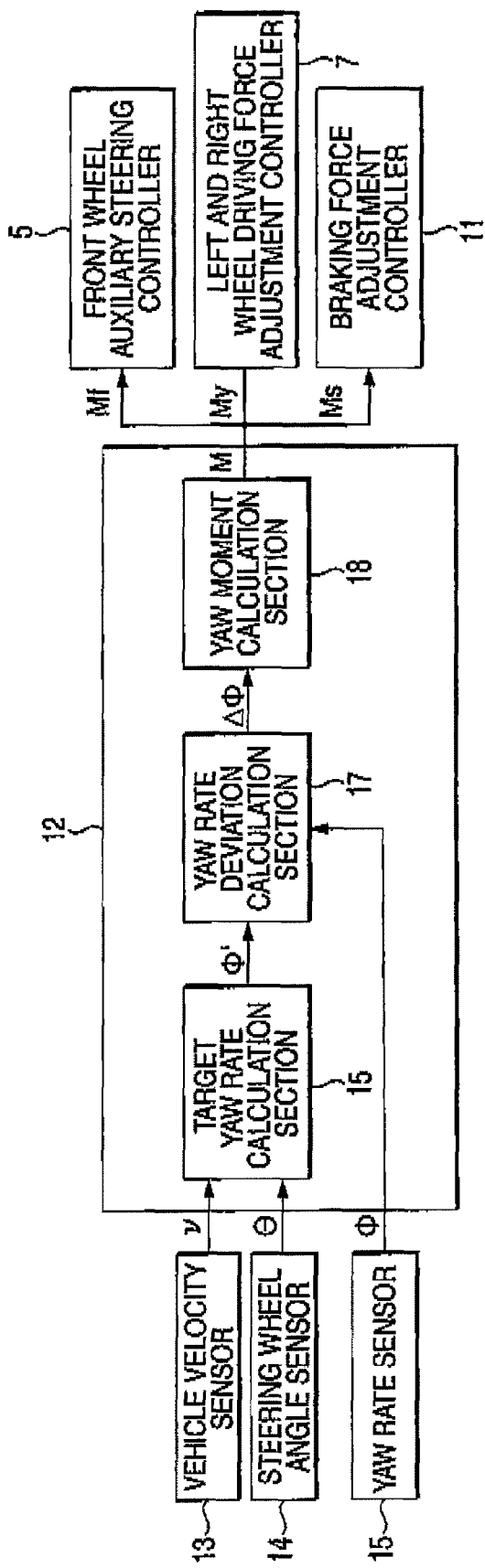
FIG. 2 is a block diagram of a control device in the turning behavior control device.
Figure 3:
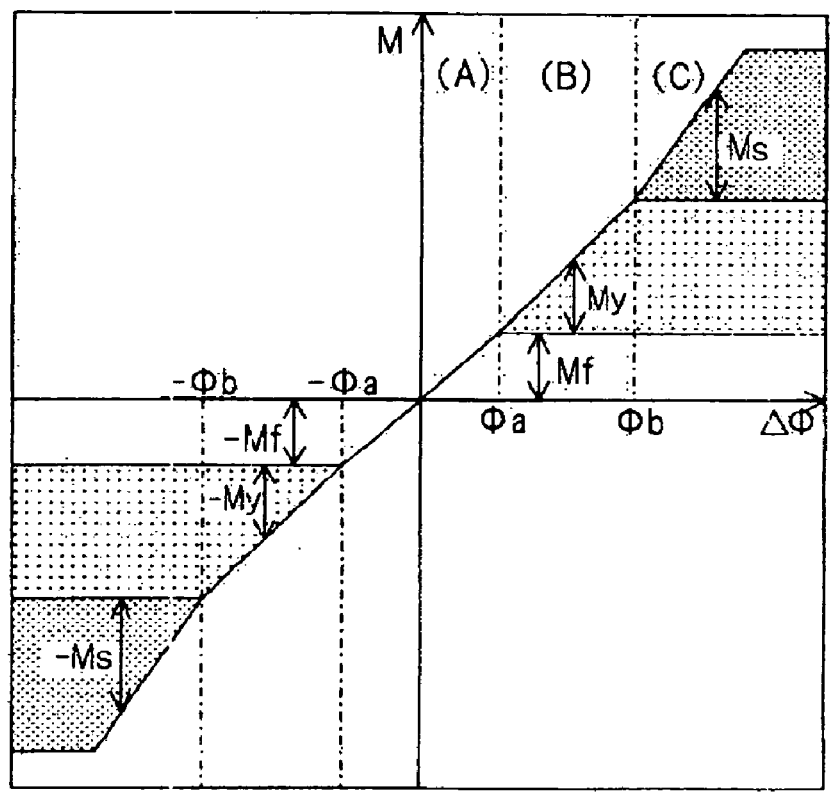
FIG. 3 is a graph showing conceptually an integrated control system for the front wheel steering angle adjustment control, the left and right wheel driving force adjustment control and the braking force adjustment control in the turning behavior control device.

An embodiment of the present invention will be described below in detail with reference to the drawings. FIG. 1 is a schematic diagram of a vehicle having a turning behavior control device according to one embodiment of the invention, FIG. 2 is a block diagram of the control device, and FIG. 3 is a graph showing conceptually an integral control system for the left and right wheel driving force adjustment control, the braking force adjustment control and the steering angle adjustment control.

The turning behavior control device for vehicle according to this embodiment is mounted on the vehicle 1, which has the front wheels 2a, 2b and the rear wheels 2c, 2d, as shown in FIG. 1.

A front wheel auxiliary steering mechanism 3 is provided between the front wheels 2a and 2b, and connected to a steering wheel 4 and a front wheel auxiliary steering controller 5. The front wheel auxiliary steering mechanism 3 is composed of a drive motor, a gear mechanism and a link mechanism (each not shown) to control a differential angle between the steering angle of the steering wheel 4 and the steering angle of the front wheels 2a, 2b. Usually, a steering shaft (not shown) is rotated in proportion to the angle of rotation of the steering wheel 4 to steer the front wheels 2a, 2b. By driving the drive motor, the rotation of the steering shaft is increased or decreased according to the angle of rotation of the steering wheel 4, producing a differential angle between the steering angle of the steering wheel 4 and the steering angle of the front wheels 2a, 2b. The front wheel auxiliary steering mechanism 3 controls the differential angle based on a signal from the front wheel auxiliary steering controller 5.

On the other hand, a left and right wheel driving force adjustment mechanism 6 is provided between the rear wheels 2c and 2d, and connected to a left and right wheel driving force adjustment controller 7. The left and right wheel driving force adjustment mechanism 6 transfers a driving force from an engine (not shown) to the rear wheels 2c and 2d. The left and right wheel driving force adjustment mechanism 6 controls a transfer amount of the driving force to the rear wheels 2c and 2d, based on a signal from the left and right wheel driving force adjustment controller 7.

The wheels 2a to 2d are provided with the brake mechanisms 8a, 8b, 8c and 8d, respectively. The brake mechanisms 8a to 8d are connected to a braking force adjustment mechanism 9, and controlled individually by the braking force adjustment mechanism 9 to give a braking force (braking effort) to each of the wheels 2a to 2d. The braking force adjustment mechanism 9 is connected to a brake pedal 10 and a braking force adjustment controller 11 to give a braking force to each of the brake mechanisms 8a to 8d according to a pedaling force of the brake pedal 10, and give a braking force difference to each of the brake mechanisms 8a to 8d based on a signal from the braking force adjustment controller 11. Also, even in a state where the driver does not the brake pedal 10, the brake mechanisms 8a to 8d are given individual braking forces.

The front wheel auxiliary steering controller 5, the left and right wheel driving force adjustment controller 7 and the braking force adjustment controller 11 are connected to the control unit 12. The control unit 12 employs an electronic control unit called an ECU, which is itself composed of a control program, a storage unit (ROM, RAM, etc.) for control map or calculation, a central processing unit (CPU) for performing the arithmetical operation, a timer counter, and an interface for input or output of the control signal.

The control unit 12 is connected to a vehicle velocity sensor 13, a steering wheel angle sensor 14 and a yaw rate sensor 15.

The vehicle velocity sensor 13 is provided on each of the wheels 2a to 2d to detect the vehicle velocity of the vehicle 1, in which the velocity of the vehicle 1 is acquired from the average velocity of each wheel speed, or the velocity of the vehicle 1 is acquired from the average velocity of a coupled driving wheel. The steering wheel angle sensor 14 is attached on the front wheel auxiliary steering mechanism 3 to detect the steering angle of the steering 4. The yaw rate sensor 15 detects the yaw rate (angular velocity of rotation) around the vertical axis of the vehicle 1.

Referring to FIG. 2, the configuration of the control unit 12 will be described below.

The control unit 12 comprises a target yaw rate calculation section 16, a yaw rate deviation calculation section 17 and a yaw moment calculation section 18, as shown in FIG. 2.

The target yaw rate calculation section 16 calculates the target yaw rate $\psi'$ when the vehicle 1 is turning, based on the vehicle velocity V of the vehicle 1 detected by the vehicle velocity sensor 13 and the steering angle $\theta$ of the steering 4 detected by the steering wheel angle sensor 14. The yaw rate deviation calculation section 17 calculates the yaw rate deviation $\Delta\psi$, based on the target yaw rate $\psi'$ calculated by the target yaw rate calculation section 16 and the yaw rate (actual yaw rate) $\psi$ actually occurring on the vehicle 1 detected by the yaw rate sensor 15.

The yaw moment calculation section 18 calculates a required yaw moment M given to the vehicle 1 while turning, based on the yaw rate deviation $\Delta\psi$ calculated by the yaw rate deviation calculation section 17, and distributes the required yaw moment M to the front wheel auxiliary steering controller 5, the left and right wheel driving force adjustment controller 7 and the braking force adjustment controller 11 at a predetermined ratio. At this time, it is assumed that the yaw moment distributed to the front wheel auxiliary steering controller 5 (front wheel auxiliary steering mechanism 3) is Mf, the yaw moment distributed to the left and right wheel driving force adjustment controller 7 (left and right wheel driving force adjustment mechanism 6) is My, and the yaw moment distributed to the braking force adjustment controller 11 (braking force adjustment mechanism 9) is Ms. That is, the yaw moment calculation section 18 distributes the required yaw moment M to the front wheel auxiliary steering controller 5, the left and right wheel driving force adjustment controller 7 and the braking force adjustment controller 11 to satisfy the expression M=Mf+My+Ms.

That is, the control unit 12 controls the front wheel auxiliary steering mechanism 3, the left and right wheel driving force adjustment mechanism 6 and the braking force adjustment mechanism 9 integrally via the front wheel auxiliary steering controller 5, the left and right wheel driving force adjustment controller 7 and the braking force adjustment controller 11 by distributing the required yaw moment (operation amount) to them, based on the vehicle velocity V detected by the vehicle velocity sensor 13, the steering angle $\theta$ of the steering 4 detected by the steering wheel angle sensor 14 and the yaw rate $\psi$ of the vehicle 1 detected by the yaw rate sensor 15.

A processing procedure of the control unit 12 configured in the above way will be described below.

The vehicle velocity V, the steering angle $\theta$ and the yaw rate $\psi$ are detected at every predetermined period. If a signal of the detected vehicle velocity V and steering angle $\theta$ is inputted into the target yaw rate calculation section 16, the target yaw rate $\psi'$ is calculated. On the other hand, if a signal of the detected yaw rate $\psi$ is inputted into the yaw rate deviation calculation section 17, the yaw rate deviation $\Delta\psi$ is calculated based on the yaw rate $\psi$ and the target yaw rate $\psi'$ inputted from the target yaw rate calculation section 16, and a signal of the yaw rate deviation $\Delta\psi$ is outputted to the yaw moment calculation section 18. At this time, the yaw rate deviation $\Delta\psi$ is obtained from a difference ($\Delta\psi=\psi'-\psi$) between the target yaw rate $\psi'$ and the yaw rate $\psi$.

The yaw rate calculation section 18 calculates the required yaw moment M, based on the input yaw rate deviation $\Delta\psi$, and determines the magnitude of yaw rate deviation $\Delta\psi$. This determination is made based on whether or not the yaw rate deviation $\Delta\psi$ is greater than a first threshold value $\psi a$, and further whether or not it is less than a second threshold value $\psi b$, if it is greater than the first threshold value $\psi a$. And there are following three cases (A) to (C), depending on the magnitude of yaw rate deviation $\Delta\psi$.

(A) $|\Delta\psi|<\psi a$
(B) $\psi a \leq |\Delta\psi| < \psi b$
(C) $\psi b \leq |\Delta\psi|$ As a result of this determination process, if it is determined that the yaw rate deviation $\Delta\psi$ is in a range (A), the required yaw moment M given to the vehicle 1 is calculated, based on the yaw rate deviation $\Delta\psi$. At this time, the required yaw moment M is replaced with the yaw moment Mf, and its signal is outputted to the front wheel auxiliary steering controller 5 alone. And the front wheel auxiliary steering controller 5 operates the front wheel auxiliary steering mechanism 3 according to the magnitude of the yaw moment Mf, and controls a differential angle between the steering angle $\theta$ of the steering 4 and the steering angle of the front wheels 2a and 2b.

Accordingly, the front wheel auxiliary steering mechanism 3 is only operated in the range (A), based on the yaw rate deviation $\Delta\psi$, to give the yaw moment Mf to the vehicle 1. That is, control is made in the range (A) to satisfy M=Mf.

If it is determined that the yaw rate deviation $\Delta\psi$ is in a range (B), the required yaw moment M given to the vehicle 1 is calculated, based on the yaw rate deviation $\Delta\psi$. Then, the yaw moments Mf, My in which the required yaw moment M is distributed to the front wheel auxiliary steering controller 5 and the left and right wheel driving force adjustment controller 7 are calculated, and its signal is outputted to the front wheel auxiliary steering controller 5 and the left and right wheel driving force adjustment controller 7. And the front wheel auxiliary steering controller 5 operates the front wheel auxiliary steering mechanism 3 according to the magnitude of the yaw moment Mf and controls a differential angle between the steering angle $\theta$ of the steering 4 and the steering angle of the front wheels 2a, 2b. Simultaneously, the left and right wheel driving force adjustment controller 7 operates the left and right wheel driving force adjustment mechanism 6 according to the magnitude of the yaw moment My and distributes the driving force by generating a movement torque between the rear wheels 2c, 2d.

Accordingly, the front wheel auxiliary steering mechanism 3 and the left and right wheel driving force adjustment mechanism 6 are operated in the range (B), based on the yaw rate deviation $\Delta\psi$, to give the yaw moments Mf, My to the vehicle 1. That is, control is made in the range (B) to satisfy M=Mf+My.

If it is determined that the yaw rate deviation $\Delta\psi$ is in a range (C), the required yaw moment M given to the vehicle 1 is calculated, based on the yaw rate deviation $\Delta\psi$. Then, the yaw moments Mf, My, Ms in which the required yaw moment M is distributed to the front wheel auxiliary steering controller 5, the left and right wheel driving force adjustment controller 7 and the braking force adjustment controller 11 are calculated, and its signal is outputted to the front wheel auxiliary steering controller 5, the left and right wheel driving force adjustment controller 7 and the braking force adjustment controller 11. And the front wheel auxiliary steering controller 5 operates the front wheel auxiliary steering mechanism 3 according to the magnitude of the yaw moment Mf and controls a differential angle between the steering angle $\theta$ of the steering 4 and the steering angle of the front wheels 2a, 2b. Simultaneously, the left and right wheel driving force adjustment controller 7 operates the left and right wheel driving force adjustment mechanism 6 according to the magnitude of the yaw moment My and distributes the driving force by generating a movement torque between the rear wheels 2c, 2d. Also, simultaneously, the braking force adjustment controller 11 operates the braking force adjustment mechanism 9 according to the magnitude of the yaw moment Ms to generate a braking force in each of the wheels 2a to 2d.

Accordingly, the front wheel auxiliary steering mechanism 3, the left and right wheel driving force adjustment mechanism 6 and the braking force adjustment mechanism 9 are operated in the range (C), based on the yaw rate deviation $\Delta\psi$, to give the yaw moments Mf, My and Ms to the vehicle 1. That is, control is made in the range (C) to satisfy M=Mf+My+Ms.

Herein, the control system for the turning behavior control device for vehicle in this embodiment which integrally controls the front wheel steering angle adjustment control, the left and right wheel driving force adjustment control and the braking force adjustment control is conceptually shown in FIG. 3. FIG. 3 shows the yaw moment amounts (yaw moments Mf, My, Ms) to be distributed from the relationship between the yaw rate deviation $\Delta\psi$ and the required yaw moment M.

The required yaw moment M is given to the vehicle 1 to over-steer or under-steer, depending on whether the vehicle 1 is turning to the left or right, or whether the yaw rate deviation $\Delta\psi$ is positive or negative. In FIG. 3, an area where the yaw rate deviation $\Delta\psi$ is negative is not explained, because the required yaw moment M is negative.

When the yaw rate deviation $\Delta\psi$ is in the range (A), the yaw moment Mf is only given to the vehicle 1, whereby the yaw moment M is increased as the yaw rate deviation $\Delta\psi$ is greater, as shown in FIG. 3. That is, as the yaw rate deviation $\Delta\psi$ is greater, the operation amount of the front wheel auxiliary steering mechanism 3 is increased.

When the yaw rate deviation $\Delta\psi$ is minute as in the range (A), the control effect of the left and right wheel driving force adjustment mechanism 6 and the braking force adjustment mechanism 9 is difficult to exhibit, whereby the front wheel auxiliary steering mechanism 3 is only operated. Thereby, the dead zone of control can be eliminated, so that the handling and stability can be improved in a normal operation area (less than the first threshold value $\psi a$). Since the left and right wheel driving force adjustment mechanism 6 and the braking force adjustment mechanism 9 are not operated, there is no problem with a power loss caused by clutch wear-out or the clutch operation, brake wear-out or heat generation, and a feeling of deceleration caused by the operation of brake.

When the yaw rate deviation $\Delta\psi$ is in the range (B), the yaw moments Mf, My are given to the vehicle 1. The yaw moment Mf is given in a fixed amount to the vehicle 1, but the yaw moment My is increased as the yaw rate deviation $\Delta\psi$ is greater. That is, as the yaw rate deviation $\Delta\psi$ is greater, the operation amount of the left and right wheel driving force adjustment mechanism 6 is increased while the operation amount of the front wheel auxiliary steering mechanism 3 is kept constant.

In this way, since the front wheel auxiliary steering mechanism 3 and the left and right wheel driving force adjustment mechanism 6 are only operated, the vehicle can run smoothly without causing a feeling of deceleration.

When the yaw rate deviation $\Delta\psi$ is in the range (C), the yaw moments Mf, My and Ms are given to the vehicle 1. The yaw moments Mf and My are given in fixed amounts to the vehicle 1, but the yaw moment Ms is increased as the yaw rate deviation $\Delta\psi$ is greater, and kept constant if the yaw rate deviation $\Delta\psi$ is greater than or equal to a predetermined value. That is, as the yaw rate deviation $\Delta\psi$ is greater, the operation amount of the braking force adjustment mechanism 9 is increased while the operation amounts of the front wheel auxiliary steering mechanism 3 and the left and right wheel driving force adjustment mechanism 6 are kept constant.

Further, if the control system is considered as a whole, the front wheel auxiliary steering mechanism 3, the left and right wheel driving force adjustment mechanism 6 and the braking force adjustment mechanism 9 are operated in order as the yaw rate deviation $\Delta\psi$ increases, whereby the mechanisms 3, 6 and 9 can take partial charge of the role without causing control interference among the mechanisms 3, 6 and 9 and exhibit their advantages. Since the mechanisms 3, 6 and 9 can give the yaw moments Mf, My and Ms to the vehicle 1 according to the magnitude of the yaw rate deviation $\Delta\psi$, the behavior of the vehicle can be stabilized efficiently.

Further, since the front wheel auxiliary steering mechanism 3 is operated at not only less than or equal to the first threshold value $\psi a$ (dead zone, during the normal operation) but also greater than or equal to the first threshold value $\psi a$ (critical area), the operation frequency of the left and right wheel driving force adjustment mechanism 6 and the braking force adjustment mechanism 9 can be smaller, whereby it is possible to suppress the problem with a power loss caused by clutch wear-out or the clutch operation, brake wear-out or heat generation, and a feeling of deceleration caused by the operation of brake. The front wheel auxiliary steering mechanism 3 is always operated before the left and right wheel driving force adjustment mechanism 6 or the braking force adjustment mechanism 9 is operated, whereby the first threshold value $\psi a$ and the second threshold value $\psi b$ can be greater. Accordingly, the problem occurring when the left and right wheel driving force adjustment mechanism 6 and the braking force adjustment mechanism 9 are operated can be further reduced.

Figure 4:
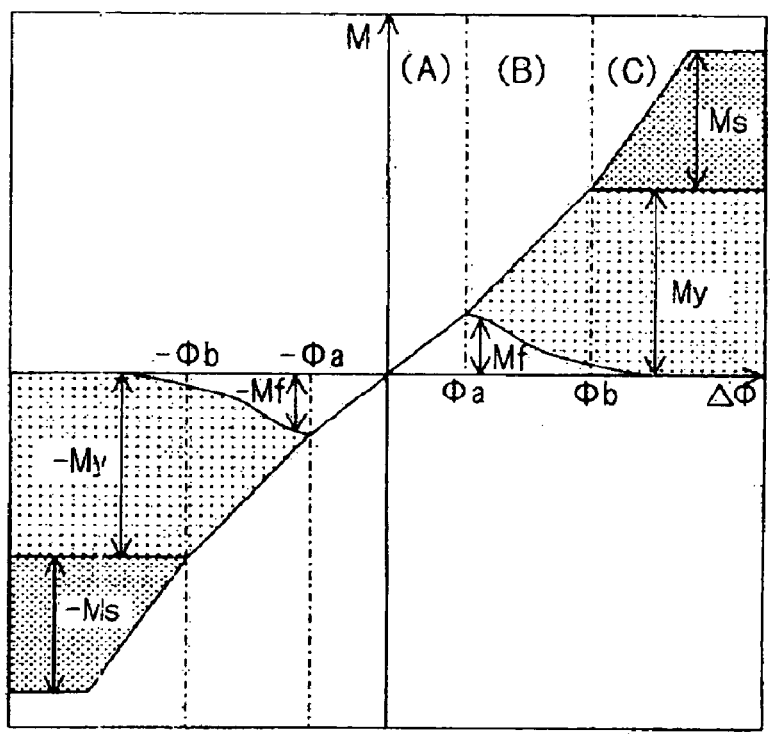
FIG. 4 is a graph showing conceptually an integrated control system for the left and right wheel driving force adjustment control, the braking force adjustment control and the steering angle adjustment control in the turning behavior control device according to another embodiment of the invention.

The operation amount of the front wheel auxiliary steering mechanism 3 can be reduced so that the yaw moment Mf may decrease from the range where it is greater than or equal to the first threshold value $\psi a$, namely, the range (B), as shown in FIG. 4. Thereby, in this critical area where the steering angle adjustment control effect of the front wheel auxiliary steering mechanism 3 is small, the left and right wheel driving force adjustment mechanism 6 or the braking force adjustment mechanism 9 can be operated in larger amount, whereby the handling and stability of the vehicle 1 can be improved.

In this embodiment, the front wheel auxiliary steering mechanism 3 as the steering angle adjustment unit is provided on the front wheels 2a and 2b, but may be provided on the rear wheel 2c and 2d. Also, the left and right wheel driving force adjustment mechanism 6 as the left and right wheel driving force adjustment unit is provided on the rear wheels 2c and 2d, but may be provided on the front 2a and 2b.

Accordingly, the turning behavior control device for vehicle according to the invention comprises the left and right wheel driving force adjustment mechanism 6 for adjusting a difference in driving force between the rear wheels 2c and 2d, the braking force adjustment mechanism 9 for adjusting a difference in braking force between the wheels 2a to 2d, the front wheel auxiliary steering mechanism 3 for adjusting the steering angle of the front wheels 2a and 2b, the vehicle velocity sensor 13, the steering angle sensor 14 and the yaw rate sensor 15 for detecting the behavior of the vehicle 1, the control unit 12 for integrally controlling the front wheel auxiliary steering mechanism 3, the left and right wheel driving force adjustment mechanism 6 and the braking force adjustment mechanism 9, based on the vehicle velocity V, steering angle $\theta$ and the yaw rate $\psi$ detected by the sensors 13, 14 and 15, the control unit 12 operating the front wheel auxiliary steering mechanism 3 before operating at least one of the left and right wheel driving force adjustment mechanism 6 and the braking force adjustment mechanism 9, whereby the dead zone of the vehicle control can be eliminated and the handling and stability of the vehicle 1 can be improved.

Also, since the control unit 12 operates the front wheel auxiliary steering mechanism 3, the left and right wheel driving force adjustment mechanism 6 and the braking force adjustment mechanism 9 in order as the behavior of the vehicle becomes unstable, the mechanisms 3, 6 and 9 can take partial charge of the role without causing control interference among the mechanisms 3, 6 and 9, and the handling and stability of the vehicle 1 can be improved.

Also, the control unit 12 has the yaw rate deviation calculation section 17 for calculating the target yaw rate $\psi'$ based on the vehicle velocity V and the steering angle $\theta$, and calculating a difference between the target yaw rate $\psi'$ and the yaw rate $\psi$, as the yaw rate deviation $\Delta\psi$, and can operate the front wheel auxiliary steering mechanism 3, the left and right wheel driving force adjustment mechanism 6 and the braking force adjustment mechanism 9 by calculating a required yaw moment M given to the vehicle 1 based on the yaw rate deviation $\Delta\psi$ detected by the yaw rate deviation calculation section 17, and distributing the required yaw moment, so that the mechanisms 3, 6 and 9 can give the yaw moments Mf, My and Ms to the vehicle 1 according to the magnitude of the yaw rate deviation $\Delta\psi$, whereby the vehicle behavior is stabilized efficiently.

Also, the control unit 12 operates the front wheel auxiliary steering mechanism 3 alone, when the yaw rate deviation $\Delta\psi$ is less than the first threshold value $\psi a$, and increase the operation amount of the front wheel auxiliary steering mechanism 3 as the yaw rate deviation $\Delta\psi$ is greater, whereby the dead zone of the vehicle control can be eliminated and the handling and stability of the vehicle 1 can be improved.

Also, the control unit 12 operates at least one of the left and right wheel driving force adjustment mechanism 6 and the braking force adjustment mechanism 9, when the yaw rate deviation $\Delta\psi$ is greater than or equal to the first threshold value $\psi a$, and decreases the contribution factor of the front wheel auxiliary steering mechanism 3 to the steering angle adjustment control as the yaw rate deviation $\Delta\psi$ is greater, to operate the left and right wheel driving force adjustment mechanism 6 or the braking force adjustment mechanism 9 in an area greater than or equal to the first threshold value $\psi a$ where the steering angle adjustment control effect of the front wheel auxiliary steering mechanism 3 is small, whereby the handling and stability of the vehicle 1 can be improved.

Moreover, the control unit 12 can decrease the operation frequency of the left and right wheel driving force adjustment mechanism 6 and the braking force adjustment mechanism 9 by keeping the control amount of the front wheel auxiliary steering mechanism 3 constant when the yaw rate deviation $\Delta\psi$ is greater than or equal to the first threshold value $\psi a$, whereby there is no problem with the clutch wear-out, brake wear-out or heat generation, and a feeling of deceleration.

The invention is applicable to the turning behavior control device for vehicle with the improved handling and stability of the vehicle while turning.

What is claimed is:

1. A turning behavior control device for a vehicle, comprising:
   a left and right wheel driving force adjustment unit that adjusts a difference in driving force between left and right wheels for the vehicle;
   a steering angle adjustment unit that adjusts a steering angle for at least one of the front and rear wheels for the vehicle;
   a vehicle behavior detection unit that detects the behavior of the vehicle; and
   a control unit that controls the left and right wheel driving force adjustment unit and the steering angle adjustment unit, based on a difference between the detected vehicle behavior detected by the vehicle behavior detection unit and target yaw rate;
   wherein the control unit operates only the steering angle adjustment unit when the difference is smaller than a first threshold value and operates the steering angle adjustment unit simultaneously with the left and right wheel driving force adjustment unit when the difference is equal to or greater than the first threshold value.

2. The turning behavior control device for vehicle according to claim 1, further comprising:
   a braking force adjustment unit that adjusts a difference in braking force between each wheel for the vehicle,
   wherein the control unit controls the braking force adjustment unit simultaneously with the steering angle adjustment unit and the left and right wheel driving force adjustment unit when the difference is equal to or greater than a second threshold value greater than the first threshold value.

3. The turning behavior control device for vehicle according to claim 2, wherein the control unit operates the steering angle adjustment unit, the left and right wheel driving force adjustment unit, and the braking force adjustment unit in this order as the vehicle difference becomes greater.

4. The turning behavior control device for vehicle according to claim 2, wherein the control unit calculates a yaw rate deviation, as the difference, based on an actual yaw rate and a target yaw rate, and calculates a required yaw moment to be given to the vehicle based on the yaw rate deviation, and operates the steering angle adjustment unit, the left and right wheel driving force adjustment unit, and the braking force adjustment unit in this order as the yaw rate deviation becomes greater.

5. The turning behavior control device for vehicle according to claim 4, wherein the control unit distributes the required yaw moment to the left and right wheel driving force adjustment unit, the braking force adjustment unit, and the steering angle adjustment unit to operate them, in which the maximum distribution amount of required moment to the steering angle adjustment unit is smaller than the maximum distribution amount of required moment to the left and right wheel driving force adjustment unit and the maximum distribution amount of required moment to the braking force adjustment unit.

6. The turning behavior control device for vehicle according to claim 2, wherein, as the difference increases, the control unit operates at least one of the left and right wheel driving force adjustment unit and the braking force adjustment unit simultaneously with the steering angle adjustment unit, and decreases an operation amount of the steering angle adjustment unit.

7. The turning behavior control device for vehicle according to claim 2, wherein the vehicle behavior detection unit comprises a vehicle velocity detection unit that detects a vehicle velocity of the vehicle, a steering amount detection unit that detects a steering amount of the vehicle, a yaw rate detection unit that detects a yaw rate occurring in the vehicle, and a yaw rate deviation calculation unit that calculates a target yaw rate based on the vehicle velocity and the steering amount and calculates a difference between the target yaw rate and the yaw rate as a yaw rate deviation, and the control unit calculates a moment to be given to the vehicle, based on the yaw rate deviation detected by the yaw rate deviation calculation unit, and distributes the moment to the left and right wheel driving force adjustment unit, the braking force adjustment unit, and the steering angle adjustment unit to operate them.

8. The turning behavior control device for vehicle according to claim 7, wherein the control unit operates the steering angle adjustment unit alone when the yaw rate deviation is less than the first threshold value, and increases the operation amount of the steering angle adjustment unit as the yaw rate deviation becomes greater.

9. The turning behavior control device for vehicle according to claim 7, wherein the control unit operates at least one of the left and right wheel driving force adjustment unit and the braking force adjustment unit when the yaw. rate deviation is greater than or equal to the first threshold value, and decreases a contribution factor of the steering angle adjustment unit to the steering angle adjustment control as the yaw rate deviation becomes greater.

10. The turning behavior control device for vehicle according to claim 8, wherein the control unit maintains the control amount of the steering angle adjustment unit constant when the yaw rate deviation becomes greater than or equal to the first threshold value.

* * * * *